Jan. 27, 1970 — F. HEINTZ ET AL — 3,492,574
SYSTEM FOR TRANSFERRING AN ELECTRIC CURRENT PARAMETER FROM HIGH VOLTAGE TO LOW VOLTAGE
Filed Sept. 29, 1967 — 4 Sheets-Sheet 1

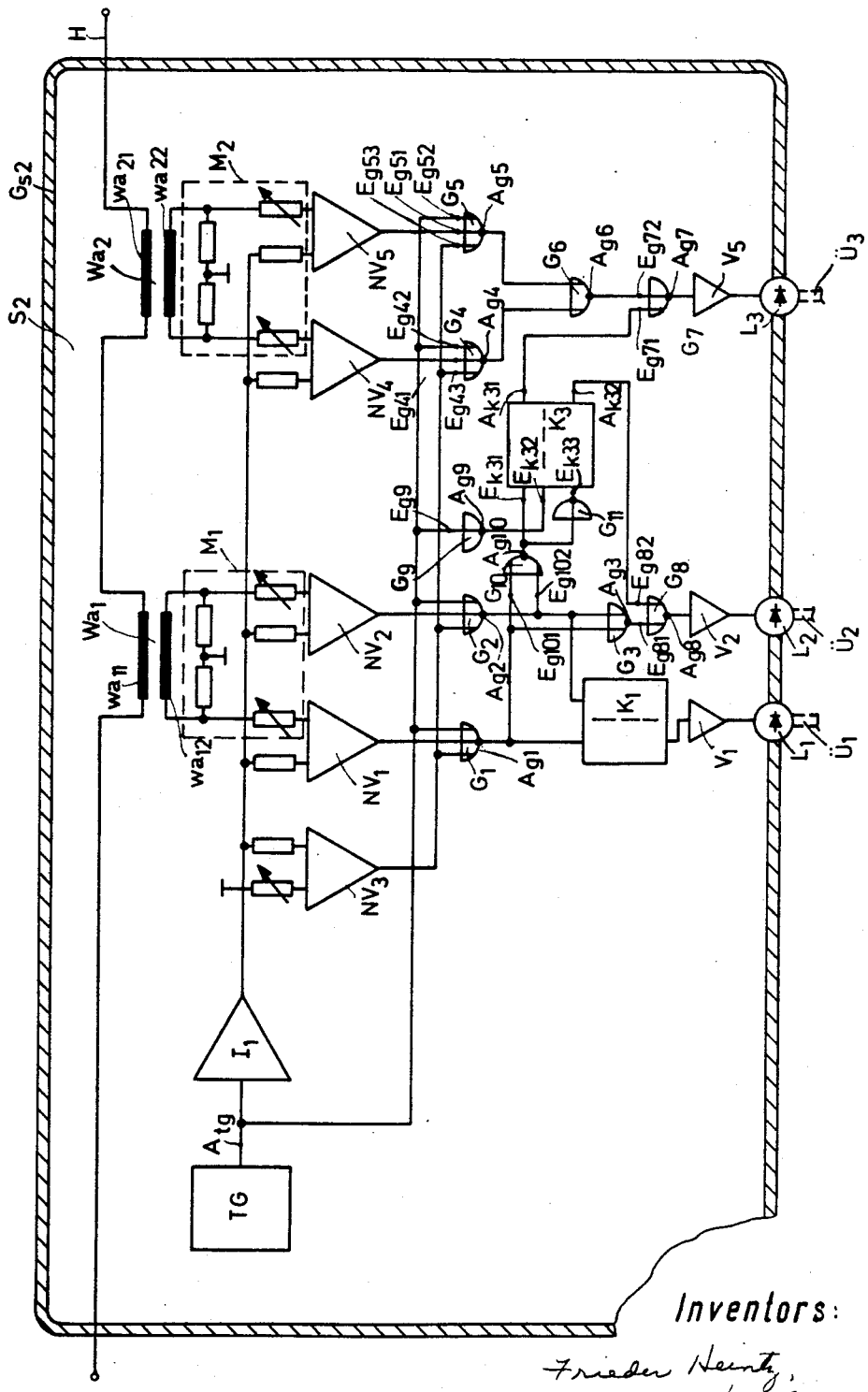

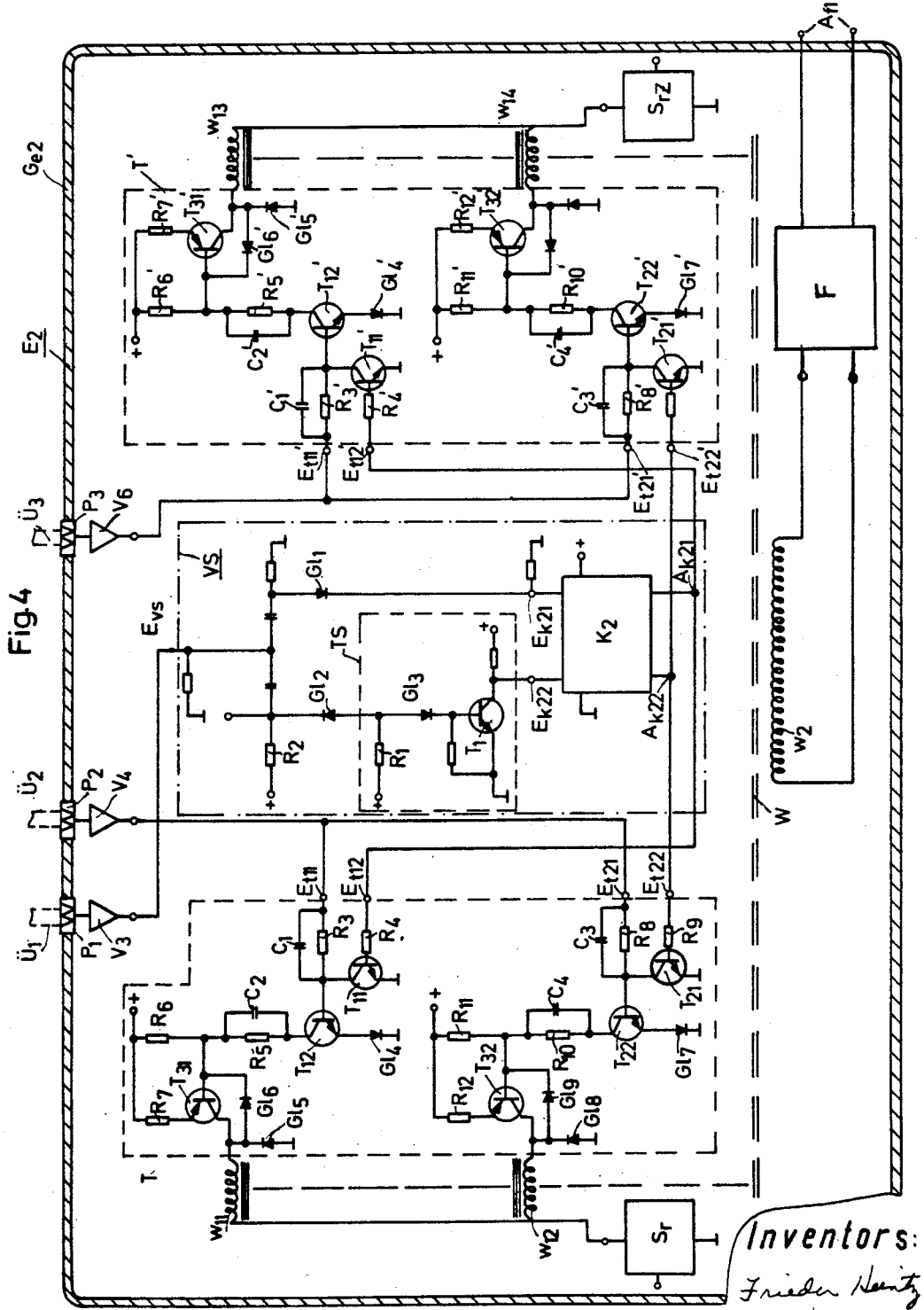

United States Patent Office 3,492,574
Patented Jan. 27, 1970

3,492,574
SYSTEM FOR TRANSFERRING AN ELECTRIC CURRENT PARAMETER FROM HIGH VOLTAGE TO LOW VOLTAGE
Frieder Heintz, Eberhard Kienzler, and Abutorab Bayati, Karlsruhe, Germany, assignors to Siemens Aktiengesellschaft, a corporation of Germany
Filed Sept. 29, 1967, Ser. No. 672,683
Claims priority, application Germany, Sept. 30, 1966, S 106,333
Int. Cl. G01r 31/00
U.S. Cl. 324—96        20 Claims

ABSTRACT OF THE DISCLOSURE

A system for measuring current in a high-voltage line provides for electrical isolation between equipment on the high-voltage side and the low-voltage equipment accessible to personnel. For this purpose, the system has measuring means coupled with the high-voltage line to furnish a measuring voltage which varies in accordance with the current to be measured and is applied to two logic networks of solid-state components both operating as periodic pulse generators. One of the networks provides a voltage pulse indicative of polarity, this pulse extending, for example, over the entire length of the current half-wave if the current is alternating. The second network is essentially a pulse-length modulator which responds to the amplitude of the measuring voltage and furnishes a voltage pulse of variable length proportional to the current being measured. Two luminescent diodes are connected to the respective networks to be actuated and issue light pulses under control by the voltage pulses. In the low-voltage receiving portion of the system, the light pulses act through an optical transmission path upon two photoelements which issue corresponding electric pulses to circuits designed to reconstitute the measuring result with the aid of a transformer. Two primary windings of the transformer are connected through the circuits to the respective photoelements and have a secondary transformer winding in common. A filter circuit connected to the secondary winding provides an output voltage proportional to the current being measured. A further improved system affords a particularly large measuring range by subdividing the high-voltage measuring means into two or more devices responsive to respectively different amplitude ranges of the current to be measured. This requires adding at least one luminescent diode in the high-voltage portion and a coacting photoelement in the low-voltage portion of the system.

Our invention relates to systems for deriving a measured quantity from a current flowing in a high-voltage circuit and transferring that quantity to low-voltage equipment electrically insulated from the high voltage, the transmission channel between high voltage and low voltage being optical, namely by pulsed beams of light issuing from the high-voltage side onto suitable photoelectric receptor means at the low-voltage side.

In over-all performance, such a system is comparable to a current transformer because, like a conventional current transformer, the system translates high current intensities into small measurable values while preserving amplitude and phase relations, aside from isolating the high-voltage conductors from the system portion kept on ground potential.

The amount of insulation needed for conventional current transformers increases approximately with the third power of the voltage. Hence the cost of the insulation required in current transformers for high-voltage distribution systems is extremely high. It has been proposed, therefore, to reduce the cost of insulation in current measuring equipment by supplying a transmitter through an amplifier with a pilot voltage derived by suitable sensing means from the current to be measured, and connecting to the output of the amplifier a bistable flip-flop which, in response to a synchronizing (clock) pulse, excites a luminescent diode as long as a reference ramp voltage, increasing from zero, reaches an amplitude equal to the pilot voltage. The ramp or saw-tooth voltage thus serving as a reference is provided from an integration amplifier and commences its ascent from the zero value at the moment when the flip-flop issues an output potential for excitation of the luminescent diode. The light pulses thus modulated as to their length (duration) are transferred through an optical transmission channel from the transmitter to a receiving device where they act upon photoelectric sensors (photoelements) and are converted back to electrical pulses. Preferably the pulses issuing from the photoelements are amplified and then converted with the aid of a filter network to a voltage proportional to the current being measured.

Systems of this type, as heretofore proposed, require a rather complicated electronic circuitry particularly on the high-voltage side where the transmitting portion of the system is located.

It is therefore an object of our invention to improve systems of the general type mentioned above by greatly simplifying the required circuitry as compared with the system heretofore proposed.

Another object of the invention relating to such systems is to secure a good linearity of measuring performance down to zero values of the current being measured.

Still another object of the invention is to considerably simplify the pulse coding and decoding equipment involved in the operation of such a system so as to require a smaller number of flip-flop stages and do away with the need for counters, particularly in the transmitting portion of the system.

A further object of the invention is to devise a system for optically transferring measuring values from a high-voltage side to a low-voltage or grounded side, that affords a measuring operation over a greatly extended range, such as for high-voltage currents in the range from 1 to 100,000; and it is also an object of the invention to secure such extreme ranges of measuring operation by providing for automatic range switching of the equipment, not requiring attendance by personnel.

In systems according to our invention we employ in part the principles of the above-mentioned known system. That is, we derive from the high-voltage current a proportional pilot (measuring) voltage and compare it with a reference ramp voltage increasing from zero. However, for transferring the measured value thus obtained, from the high-voltage side of the equipment to the low-voltage side, we proceed in a way fundamentally different from the principles heretofore applied.

According to the invention, we apply the pilot voltage, derived at the high-voltage side from the current being measured, to two logic networks operating as pulse generators. One of these networks is equipped with switching means responsive to the zero value of the pilot voltage and thus furnishes an output pulse indicative of the instantaneous polarity of the pilot voltage. If the current and hence the pilot voltage are alternating, such a pulse may extend over the length of a half-wave. The other logic network comprises a pulse-length modulator and responds to the amplitude of the pilot voltage to furnish a second output pulse of variable length proportional to the amplitude of the current being measured. The output pulses of the two pulse generating networks are applied to respective luminescent diodes preferably through respective amplifiers. The low-voltage receiver means of the system are electrically insulated from the high-voltage portion above described. The receiver means comprise two photoelectric sensors (photoelements) optically responsive to the light issuing from the respective luminescent diodes. The receiver means are further provided with circuitry for reconstituting the pilot voltage so as to furnish an output proportional in amplitude and accurately phase related to the high-voltage current being measured.

According to more specific features of our invention, each of the two pulse-generating logic networks in the transmitting portion of the system comprises a null amplifier which has two inputs connected to the pilot voltage and to the ramp voltage received from an integrator. Connected to the output of each null amplifier is one input of a coincidence gate which has a second input to a keyer or clock-pulse generator whereby the gates are controlled by the sync (clock) pulses furnished from the keyer. The output of each gate is connected with one of the two inputs of a bistable flip-flop and also with one of the inputs of an additional gate whose output is connected to a luminescent diode, the output of the bistable flip-flop being connected to another luminescent diode. As mentioned, these two luminescent diodes form part of respective optical transmission channels leading to the receiving portion of the system and acting upon respective photoelements. These are connected through solid-state amplifier networks, preferably transistor networks, to the separate primary windings of the above-mentioned transformer whose secondary circuit comprises a filter network to furnish the low-voltage measuring quantity proportional to the current being measured.

The above-mentioned null amplifiers are differential switching amplifiers which are supplied with two input voltages and which switch their output voltage from "0" to "1" when the difference of the input voltages reaches the zero value. Consequently, the amplifier output changes its logic state whenever the differential input passes through zero.

Preferably the two gates connected to the above-mentioned null amplifiers in the transmitter portion of the system are each provided with a third input which is connected with the output of an additional null amplifier. This third null amplifier has one input connected to ground and the other input to the integrator so that the third null amplifier changes its output voltage and thus releases the gates exactly when the output voltage and thus integrator passes from negative values through zero volt. At that precise moment, therefore, the third null amplifier releases for operation the two gates which follow the two other null amplifiers.

The above-mentioned integrator is essentially a ramp-voltage or saw-tooth generator. On account of the releasing operation just explained, the integrator commences its saw tooth at a negative voltage and thus secures accurate linearity of the integrator output ramp voltage in the zero region.

According to further features of our invention, the one photoelement that, in the receiving portion of the system, responds to the luminescent diode controlled through the bistable flip-flop, is connected to the above-mentioned transistor or other solid-state amplifier circuitry through an interposed (polarity) sign-storing memory. This memory comprises a bistable flip-flop whose one output provides a voltage as long as the current being measured on the high-voltage side of the system has one given polarity, and whose other output provides a voltage when the current being measured has the other polarity.

One of the two inputs of the bistable flip-flop in the sign memory is connected, preferably through a diode, with the input of the sign memory, whereas the other input of the bistable flip-flop is connected to the input of the sign memory through an interposed transistor circuit and through a further diode poled in opposition to the first-mentioned diode. The other photoelement in the receiving portion of the system is connected, preferably through an interposed amplifier, to two inputs of the transistor amplifier network; and each of these two inputs is connected with a further, complementary input of the same transistor amplifier network, the two complementary inputs being in turn connected with one of the two respective outputs of the bistable flip-flop appertaining to the sign memory.

Each of the first-mentioned two inputs of the transistor amplifier network is connected through a resistor and a parallel connected capacitor to the collector of the appertaining transistor, for example a transistor of the npn type whose emitter is grounded; and the other input is connected through another resistor to the base of the same transistor. The collector of the transistor is in connection with the base of a further transistor, for example likewise of the npn type. When the potentials at the mutually complementary inputs of the transistor network differ from each other, the last-mentioned transistor, acting through an additional transistor, for example of the pnp type, causes a direct-current pulse to pass through one of the primary windings of the transformer, whereas no direct-current pulse is issued when the respective potentials are equal.

The primary windings of the transformer are preferably connected to a supply of a highly constant reference potential, which issues the above-mentioned direct-current pulses of constant amplitude in dependence upon the ON or OFF state of the additional transistors.

In systems of the type here concerned, it is often desired to provide for an extremely wide measuring range, for example of 1:100,000. Such a range could be covered by employing null amplifiers having a correspondingly large linearity range. However null amplifiers of such a large dynamic range cannot be realized or require an excessive amount of equipment or cost. It is therefore of advantage in systems according to the invention to provide for a large measuring range with the aid of range switching. According to the invention this is done by employing an additional optical transmission channel.

According to more specific features of this aspect of our invention, a range-switching system is provided with another measuring circuit for deriving another pilot voltage from the current to be measured. Further null amplifiers are connected to this measuring circuit and are controlled by the derived pilot voltage and by the above-mentioned ramp voltage from the integrator so as to operate as a second pulse generator for issuing length-modulated pulses in a range of current intensities bordering the range of the other pulse-length modulating null amplifier network. We further connect the outputs of both of these pulse-length modulators to respective luminescent diodes through respective auxiliary gates and control the latter gates in dependence upon the magnitude of the current to be measured on the high-voltage side of the system. The third luminescent diode forms part of a third optical transmission channel and acts upon a third photoelement which in the receiving portion of the system is connected through another transistor amplifier network with two further primary windings of the above-mentioned transformer.

The above-mentioned circuit for deriving the pilot voltage in a system according to the invention is preferably designed as a resistance network energized from an inductive sensing member controlled by the current to be measured. A voltage drop produced by the current in the resistance network represents the derived pilot voltage. Applicable as an inductive sensing member, assuming the high-voltage current is alternating, are non-insulated current transformers. If the system according to the invention serves to measure direct current, the inductive sensing member may consist of a Hall generator, for example.

The resistance network is preferably designed as a bridge network. The voltages occurring at the respective resistors of a bridge branch have mutually opposed polarities referring to the mid-point of the bridge. The voltages of one polarity are applied to one of the two null amplifiers, and the voltages of the other polarity are supplied to the other null amplifier. This applies regardless of whether or not the system is equipped for range switching.

The above-mentioned and further objects, advantages and features of our invention, said features being set forth with particularity in the claims annexed hereto, will be apparent from, and will be described in, the following with reference to embodiments of systems according to the invention illustrated by way of example on the accompanying drawings in which:

FIG. 3 shows schematically an embodiment of the transmitting portion of a system according to the invention equipped for automatic switching between measuring ranges; and FIG. 4 is a schematic diagram of a receiving portion appertaining to the same system as FIG. 3.

Figure 1:
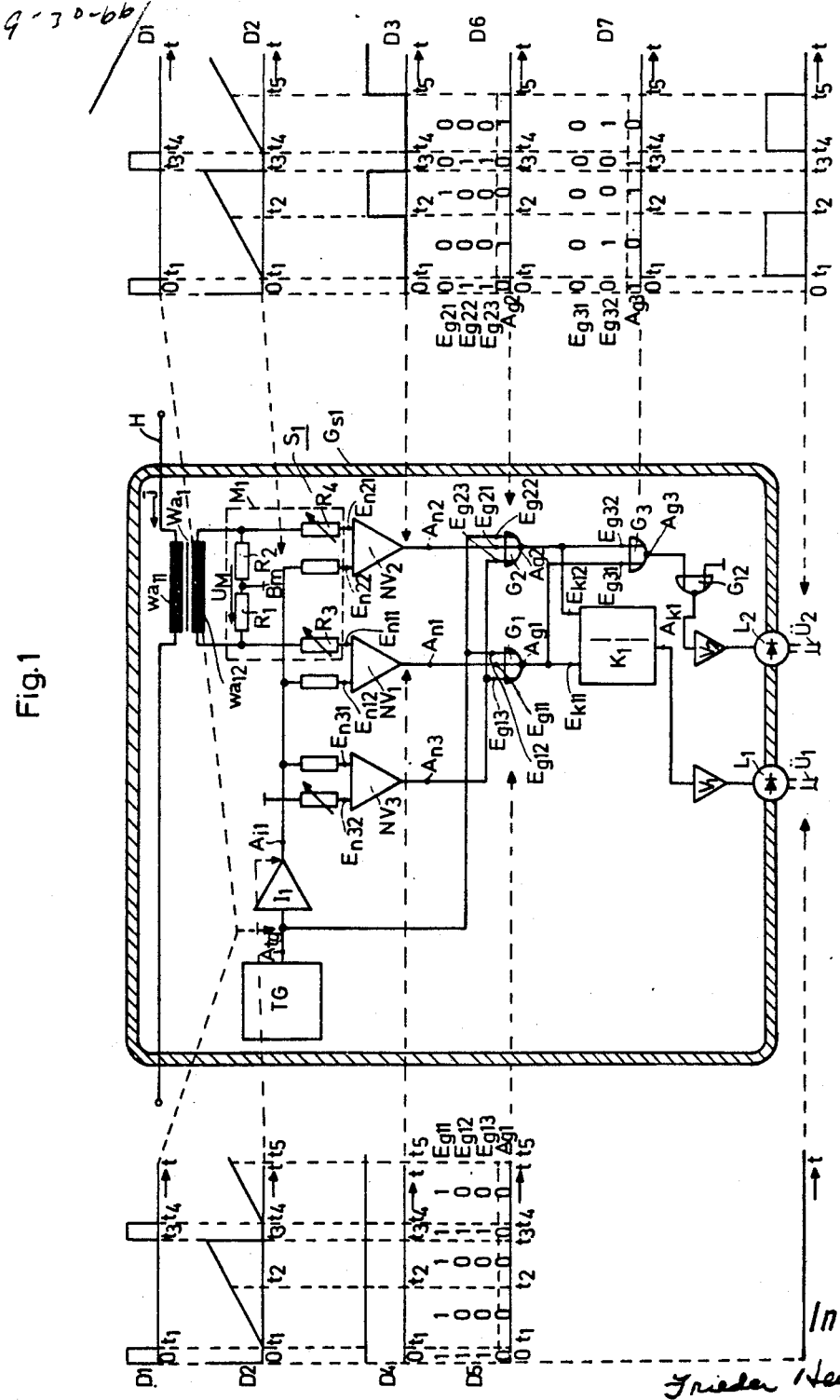
FIG. 1 shows schematically a transmitting portion of a system for measuring a high-voltage alternating current, FIGS. 1a and 1b being voltage-time diagrams explanatory of the operation of the illustrated system.

The transmitting portion $S_1$ of the system illustrated in FIG. 1 serves to measure an alternating current J flowing through a high-voltage line H. The transmitter equipment is installed directly on the high-voltage line H and is preferably enclosed in a housing $G_{s1}$. The electrical connection of the transmitting equipment $S_1$ with the high-voltage line H is effected by means of a non-insulated current transformer $Wa_1$ whose primary winding $wa_{11}$ is traversed by the current J to be measured. The secondary winding $wa_{12}$ of the transformer $Wa_1$ is connected with a measuring circuit $M_1$ formed essentially of a resistance bridge network with resistors $R_1$, $R_2$, $R_3$ and $R_4$. Two null amplifiers $NV_1$ and $NV_2$ have each an input $E_{n11}$ or $E_{n21}$ connected to the measuring network $M_1$ so as to receive respective input voltages of mutually opposed polarity relative to the grounded mid-point $Bm$ of the bridge network. The other input $E_{n12}$ or $E_{n22}$ of the respective two null amplifiers $NV_1$ and $NV_2$ is connected with the output $A_{11}$ of an integrator $I_1$ whose input is connected with the output $A_{tg}$ of a keyer or clock-pulse generator TG which furnishes synchronizing clock pulses. As explained, the null amplifiers are designed as difference amplifiers. The inputs $E_{n11}$ and $E_{n21}$ constitute the respective inverted inputs.

The sync pulses from the clock or keyer TG occur during the intervals $0-t_1$ and $t_3-t_4$ in the voltage-time diagram D1 shown in FIGS. 1a and 1b. The saw-tooth or ramp voltage supplied from the integrator $I_1$, which is active as a ramp-voltage generator, occurs during the intervals $t_1-t_3$ etc. in the diagram D2 shown in FIGS. 1a and 1b.

The respective outputs $A_{n1}$ and $A_{n2}$ of the two null amplifiers $NV_1$ and $NV_2$ are connected to one of the inputs $E_{g11}$ and $E_{g21}$ of respective NOR gates $G_1$ and $G_2$. Further inputs $E_{g12}$ and $E_{g22}$ of the respective gates $G_1$ and $G_2$ are connected with the output $A_{tg}$ of the clock TG. Each of the two gates $G_1$ and $G_2$ has a third input $E_{g13}$ or $E_{g23}$ connected with the output $A_{n3}$ of an additional (third) null amplifier $NV_3$. One of the two inputs, namely the one denoted by $E_{n31}$, of the amplifier $NV_3$ is connected to the output $A_{11}$ of the integrator $I_1$, the other input $E_{n32}$ being grounded.

The output $A_{g1}$ of gate $G_1$ is connected with an input $E_{k11}$ of a bistable flip-flop $K_1$ and also with the input $E_{g31}$ of an additional NOR gate $G_3$. The output $A_{g2}$ of gate $G_2$ is connected with a further input $E_{k12}$ of the bistable flip-flop $K_1$ as well as with a further input $E_{g32}$ of the additional gate $G_3$. Connected to the output of gate $G_3$ is a further gate $G_{12}$ whose other input is grounded.

The output of $A_{k1}$ of the flip-flop $K_1$ is connected through an amplifier $V_1$ with a luminescent diode $L_1$ at the transmission end of an optical transmission channel $U_1$. Analogously, the output $A_{g3}$ of the additional gate $G_3$ is connected through a further gate $G_{12}$ and an amplifier $V_2$ with a second luminescent diode $L_2$ at the transmitting end of a second optical transmission channel $U_2$. The optical transmission paths $U_1$ and $U_2$ may extend through glass fibers or fiber bunches of plastic material.

When alternating current J flows through the high-voltage line H, the measuring circuit $M_1$ derives from the current a measuring pilot voltage $U_M$. At a given moment the bridge network then supplies a voltage of negative polarity, for example, to the amplifier $NV_2$ and simultaneously a voltage of the same amplitude but positive polarity to the amplifier $NV_1$. This produces the following effects. The clock TG issues the sequence of clock pulses apparent from the diagram D1 in FIGS. 1a and 1b. As will be seen from the diagram D2, each clock pulse causes its rising (forward) flank to reduce the output voltage of the integrator $I_1$ to approximately the zero value whereas the next following rear flank of the clock pulse causes the integrator output voltage to increase continuously in linear proportion to time.

The provision of the additional null amplifier $NV_3$ is preferable especially because the integrator $I_1$, when responding to the rear flank of a clock pulse, does not, as a rule, lower its output voltage exactly to the zero value but down to a slight negative output amplitude. The additional amplifier $NV_3$ compares the integrator output voltage with a voltage referred to zero, and thus prevents the system from being affected by a negative output voltage of the integrator. This affords the assurance that the two gates $E_{g12}$, $E_{g22}$ which follow the null amplifiers $NV_1$, $NV_2$ are released by the additional null amplifier $NV_3$ precisely at the moment when the ascending ramp voltage of the integrator reaches the zero value.

As the ramp voltage from the integrator increases from the zero value, and with the above-assumed polarities of the voltages at the respective inputs $E_{n11}$ and $E_{n21}$ of the null amplifiers $NV_1$ and $NV_2$, and in dependence upon the amplitude of the voltage $U_M$ and hence also in dependence upon the intensity of the current J, the following will occur. At the end of the interval of $t_1-t_2$ (diagram D2) the input stage of the null amplifier $NV_2$ will just reach a balance condition at which the voltage difference between the output voltage of the measuring network $M_1$ and the ramp voltage of the integrator $I_1$ becomes zero. At this moment the output voltage of the null amplifier $NV_2$ jumps from amplitude "0" to amplitude "1" (diagram D3 in FIG. 1b). This is because the two null amplifiers $NV_1$ and $NV_2$ are so connected that the voltage $U_M/2$ is applied to the inverted input of the null amplifiers while simultaneously the integrator ramp voltage is applied to the non-inverted input. As a result, with a positive value of the voltage $U_M/2$ and an integrator voltage of zero volt, there obtains at the output $A_{n2}$ a voltage value "0." Only when the integrator output voltage has attained the value $U_M/2$, will the voltage at the output $A_{n2}$ jump to the value "1."

Since at the instantaneous condition of the current J here considered, the voltage polarity at the input $E_{n11}$ of null amplifier $NV_1$ is opposed to the voltage polarity at the input $E_{n21}$ of null amplifier $NV_2$, there results in the input circuit of the null amplifier $NV_1$ a voltage of persistently positive amplitude. As a consequence, the output $A_{n1}$ of the null amplifier $NV_1$ furnishes a voltage of the amplitude value "1" during the entire linear rise of the ramp voltage from the integrator $I_1$. This is apparent from the diagram D4 (FIG. 1a).

The behavior of the additional (third) null amplifier $NV_3$ is such that its output voltage will jump from "1" to "0" when the output voltage of integrator $I_1$, rising linearly from low negative values, reaches the zero passage.

Since according to diagram D1 the voltage from clock TG drops at the end of each clock pulse from the potential "1" to the potential "0," the following input potentials, apparent from diagrams D5 and D6 (FIGS. 1a and 1b), will result at the three inputs of each of the gates $G_1$ and $G_2$. In the diagrams D5 and D6 no consideration is given to the fact that the integrator commences its ramp voltage at negative values. In the time interval between 0 and $t_1$ the input $E_{g11}$ has the potential "1," the input $E_{g12}$ the potential "1," and the input $E_{g13}$ the potential "1." In the interval between $t_1$ and $t_2$ the input $E_{g11}$ has the potential "1," the input $E_{g12}$ the potential "0," and the input $E_{g13}$ the potential "0." In the interval between $t_2$ and $t_3$ the inputs $E_{g11}$ to $E_{g13}$ retain their potentials. Only in the interval between $t_3$ and $t_4$ will the inputs $E_{g12}$ and $E_{g13}$ assume the same potentials that they exhibited in the interval between 0 and $t_1$. Input $E_{g11}$ remains at "1" since a negative potential is now applied to input $E_{n11}$. Due to the fact that the gate $G_1$ is a NOR gate, its output $A_{g1}$ has "0" potential during the entire period of time from 0 to $t_4$.

The potentials which in the period of time just considered are effective at the inputs $E_{g21}$ to $E_{g23}$ of gate $G_2$ are apparent from the diagram D6. It will be seen that the output $A_{g2}$ of gate $G_2$ during the interval between 0 and $t_1$ is at "0" potential, in the interval between $t_1$ and $t_2$ at the "1" potential, in the interval between $t_2$ and $t_3$ at "0" potential, and in the interval between $t_3$ and $t_4$ also at "0" potential.

From the potential distribution in the different time intervals at the outputs $A_{g1}$ and $A_{g2}$ of the respective gates $G_1$ and $G_2$ there results at the inputs $E_{g31}$ and $E_{g32}$ of the additional gate $G_3$ the potential distribution indicated in diagram D7. It follows from this potential distribution that the gate $G_3$ at its output $A_{g3}$ has the potential "1" in the interval between 0 and $t_1$, the potential "0" in the interval between $t_1$ and $t_2$, the "1" potential in the interval between $t_2$ and $t_3$, and the same "1" potential in the interval between $t_3$ and $t_4$.

It will be recognized from the above-elucidated diagrams of FIGS. 1a and 1b that during the operating condition under consideration, namely during one-half wave of the current J flowing through the high-voltage line H, no light will be transmitted through the optical channel $U_1$ for the entire period of time between 0 and $t_4$; and that the channel $U_2$ will transmit light only during the time interval between $t_1$ and $t_2$. In other words, the luminescent diode $L_1$ remains dark during the duration of a positive half-wave (0–$t_4$) of the current being measured, and the luminescent diode $L_2$ is lighted only during the interval $t_1$–$t_2$. Thus the transmission of light through the path $U_1$ is indicative of the phase position of the current being measured; and since the time interval between $t_1$ and $t_2$ corresponds to the amount of time required for the linearly increasing ramp voltage of the integrator $I_1$ to reach the instantaneous amplitude value of the voltage derived from the current J, the light pulse passing through the transmission path $U_2$ indicates by its duration the amplitude of the current J being measured.

Figure 2:
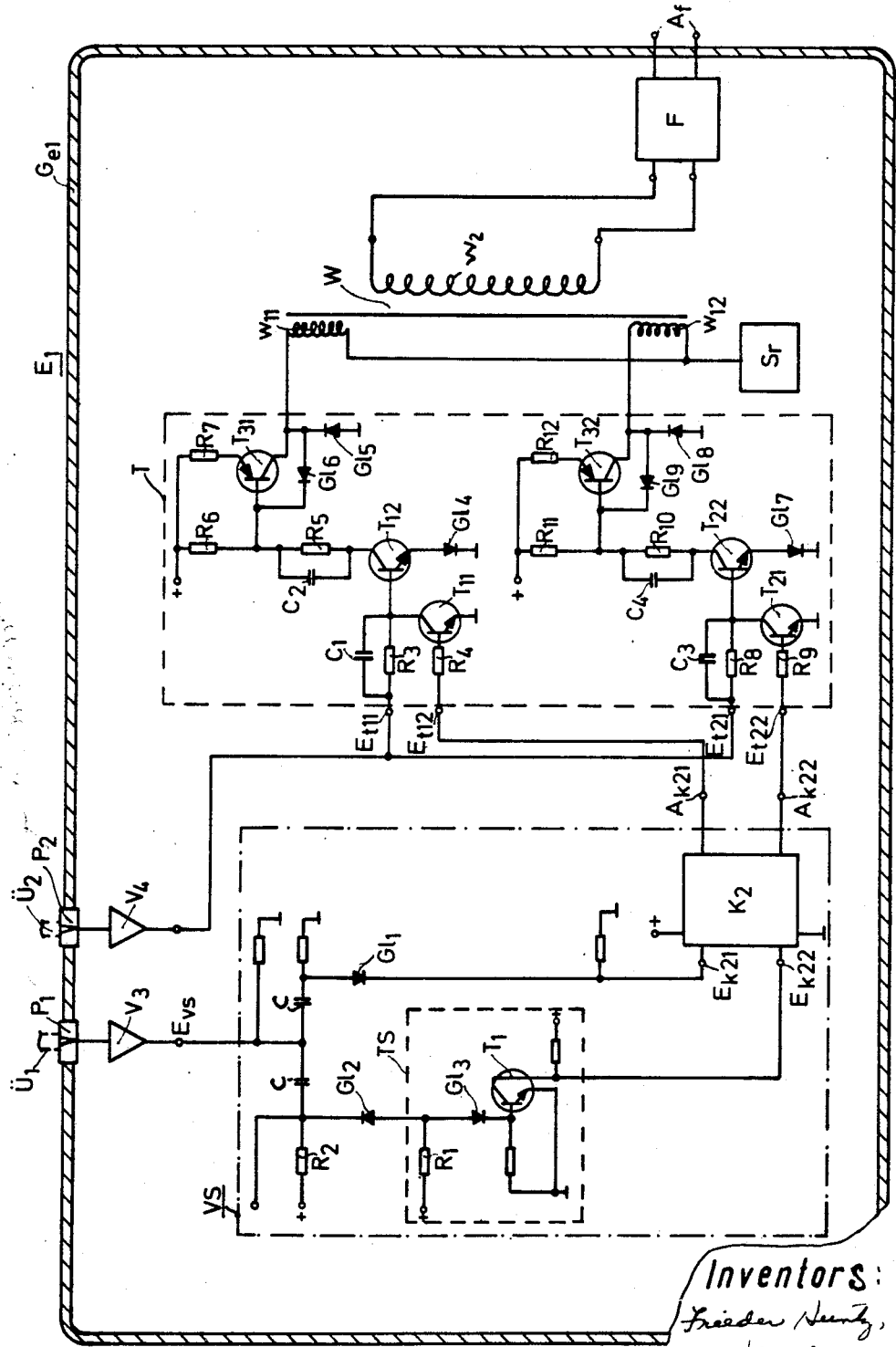
FIG. 2 is a schematic diagram of the receiving portion appertaining to the same system as FIG. 1.

FIG. 2 shows the receiving device $E_1$ appertaining to the transmitting device $S_1$ according to FIG. 1. The receiving device $E_1$ is preferably accommodated in a grounded housing $G_{e1}$ and comprises a polarity sign memory VS, a solid-state amplifier which in this embodiment is constituted by a transistor network T, a transformer W energized from the network T, and a filter network F connected in the secondary circuit of the transformer.

The input $E_{vs}$ of the sign memory VS is connected with a photoelement $P_1$ preferably through an amplifier $V_3$. The photoelement $P_1$ forms part of the optical transmission channel $U_1$ and responds to the radiation pulses from the luminescent diode $L_1$ in the transmitting device $S_1$ (FIG. 1). One input $E_{k21}$ of a bistable flip-flop $K_2$ is connected to the input $E_{vs}$ of the memory VS through a diode $Gl_1$. The other input $E_{k22}$ of the flip-flop $K_2$ is connected with the same input $E_{vs}$ of the memory VS through a transistor circuit TS and another diode $Gl_2$.

The transistor circuit TS comprises a transistor $T_1$ which has its base connected through a diode $Gl_3$ in series with a resistor $R_1$ to the plus pole of a direct-voltage source. The above-mentioned diode $Gl_2$ is also connected to a resistor $R_2$ with the plus pole of a direct-voltage source, a single direct-voltage supply being suitable for all of the corresponding sources mentioned in this description of FIG. 2.

The two outputs $A_{k21}$ and $A_{k22}$ of the bistable flip-flop $K_2$ in memory VS are connected with the transistor amplifier network T in a manner described hereinafter.

A second photoelement $P_2$ forms the end of the second optical transmission channel $U_2$ and is connected preferably through an amplifier $V_4$ with two inputs $E_{t11}$ and $E_{t21}$ of the transistor circuit T. The input $E_{t11}$ is connected through a resistor $R_3$ and a parallel capacitor $C_1$ with the collector of an npn transistor $T_{11}$ as well as with the base of another npn transistor $T_{12}$. The base of transistor $T_{11}$ is connected through a resistor $R_4$ with another input $E_{t12}$ of the transistor amplifier network, the input $E_{t12}$ being also connected to the output $A_{k21}$ of the bistable flip-flop $K_2$ in the memory VS. The emitter of the transistor $T_{11}$ is grounded.

The emitter of the transistor $T_{12}$ is grounded through a diode $Gl_4$. The collector of transistor $T_{12}$ is connected to the base of an additional transistor $T_{31}$ through a resistor $R_5$ and a parallel capacitor $C_2$. The same collector of transistor $T_{12}$ is also connected through a resistor $R_6$ with the plus pole of a direct-voltage source. This plus pole is further connected through another resistor $R_7$ with the emitter of the additional transistor $T_{31}$ whose collector is grounded through a diode $Gl_5$ and is also connected through a further rectifier $Gl_6$ with the base, on the one hand, and to one end of a primary winding $w_{11}$ of a transformer W, on the other hand. The other end of the primary winding $w_{11}$ is connected to a supply $S_r$ of highly constant reference voltage.

In a similar manner, the further input $E_{t21}$ of the amplifying transistor network T is connected with the collector of an npn transistor $T_{21}$ through a resistor $R_8$ in parallel with a capacitor $C_3$; and the same input in connected with the base of a further npn transistor $T_{22}$. The emitter of transistor $T_{21}$ is grounded. The base of this transistor is in connection through a resistor $R_9$ with a further input $E_{t22}$ of the amplifying transistor network T. This input $E_{t22}$ is connected to the output $A_{k22}$ of the bistable flip-flop $K_2$ in the sign memory VS.

The emitter of transistor $T_{22}$ is grounded through a diode $Gl_7$, the collector being connected through a resistor $R_{10}$ and a parallel capacitor $C_4$ with the base of an additional transistor $T_{32}$, and being also connected through a resistor $R_{11}$ with the plus pole of a direct-voltage source. The same plus pole is connected through a resistor $R_{12}$ with the emitter of the additional pnp transistor $T_{32}$ whose collector is grounded through a diode $Gl_8$ and is also connected through a further diode $Gl_9$ to the base, as well as to one end of a second primary winding $w_{12}$ wound in opposing sense to the primary winding $w_{11}$ in the transformer W. The other winding end of the primary winding $w_{12}$ is connected to the supply $S_r$ of constant reference voltage.

The functioning of the transmitting portion $S_1$ of the system according to the invention has been described above on the assumption that at the moment under consideration a given (positive) half-wave of the current J in the high-voltage line is involved and consequently a corresponding half-wave of the measuring or pilot voltage $U_M$ (FIG. 1). During the entire period of time thus being observed, no light passes through the first optical transmission path $U_1$, whereas the second optical transmission path $U_2$ transmits light only in the interval of time between moments $t_1$ and $t_2$. Predicating the following description of the operations occurring in the receiving device of FIG. 2 upon the same conditions and observations, it will be recognized that the voltage at the input $E_{vs}$ of memory VS changes its logic state with each zero passage of the sinusoidal pilot voltage $U_M$ (FIG. 1). Consequently, the input $E_{vs}$ receives square-wave pulses which have the value "1" during the positive half-wave of the pilot voltage $U_M$, and have the value "0" during the negative half-wave.

The input stage of the memory VS comprises capacitors C which together with appertaining resistors serve to differentiate the pulses received at the input $E_{vs}$. The resulting negative pulse spike arriving at the moment $t_1$ through diode $Gl_2$ at the transistor $T_1$ produces momentarily a positive pulse at the input $E_{k22}$ of the bistable flip-flop $K_2$ and thus brings the flip-flop to the stable state at which its output $A_{k22}$ has the potential "0" and its output $A_{k21}$ the potential "1."

At the following moment $t_2$ the positive pulse spike triggers through diode $Gl_1$ the flip-flop $K_2$ back to the inverse state.

Consequently at the moment $t_1$ the input $E_{t22}$ of the amplifying transistor network T is at "0" potential. The output $A_{k21}$ of flip-flop $K_2$ and hence the input $E_{t12}$ of the transistor amplifier network T have "1" potentials.

Since a light pulse passes from the transmitting device $S_1$ to the receiving device $E_1$ only in the interval of time from $t_1$ to $t_2$, the "1" potential obtains only in this particular interval at the two interconnected inputs $E_{t11}$ and $E_{t21}$.

This potential distribution at the inputs of the transistor amplifier network T causes the transistor $T_{21}$ to remain turned off. Now the base of the transistor $T_{22}$ is at a positive potential so that transistor $T_{22}$ is turned on. This reduces the potential at the base of the additional transistor $T_{32}$ which is thereby made conductive since it is an npn transistor, and which thus causes a pulse of direct current to pass from the supply $S_r$ of constant reference voltage through the primary winding $w_{12}$ of the transformer W. The direct-current pulse is inductively transferred to the secondary winding $w_2$ from which it passes to the filter network F.

The filter network, preferably designed as a low pass, is thus supplied with a sequence of length-modulated pulses and separates the signal frequency from those frequencies that are due to the switching functions. The filter network therefore issues at its output $A_f$ a measuring quantity (voltage) proportional to the current J in the high-voltage line H.

The potentials at the inputs $E_{t11}$ and $E_{t12}$ of the transistor amplifier network T are without effect in this case, since the "1" potential at input $E_{t12}$ causes the transistor $T_{11}$ to be turned on, whereby the potential at the base of the further transistor $T_{12}$ becomes negative. As a result, the transistor $T_{12}$, as well as the additional transistor $T_{31}$, remains turned off. Accordingly no direct current flows through the secondary winding $w_{11}$ of the transformer W. This situation changes only when the current J in the high-voltage line H reverses its polarity. This occurs at the beginning of the next following half-wave, assuming the current J is alternating.

In order to permit at the secondary winding $w_2$ of transformer W a distinction as to which polarity is coordinated to the length-modulated light pulses transmitted through the optical transmission path $U_2$ at a time, the two primary windings $w_{11}$ and $w_{12}$ of transformer W have a mutually opposed winding sense. The electrical pulses occurring in the secondary winding $w_2$ are thus coordinated to the respective half-waves of the high-voltage current J in accordance with the different polarities of these pulses.

The system according to the invention embodied in the transmitting device shown in FIG. 3 and the appertaining receiving device shown in FIG. 4 is designed for switching between two measuring ranges. To facilitate understanding, the same reference characters are used in FIGS. 3 and 4 as in FIGS. 1 and 2 for functionally corresponding components respectively.

The transmitting device shown in FIG. 3 corresponds largely to the one described with reference to FIG. 1. It will be recognized, however, that FIG. 3 shows a second non-insulated current transformer $Wa_2$ whose primary winding $wa_{21}$ is traversed by the current J to be measured. The secondary winding $wa_{22}$ energizes a second measuring network $M_2$ to which two further null amplifiers $NV_4$ and $NV_5$ are connected. Each of these null amplifiers is connected to an input $E_{g41}$ or $E_{g51}$ of a gate $G_4$ or $G_5$, and each of these gates has another input $E_{g42}$ or $E_{g52}$ connected to the output $A_{tg}$ of the keyer TG to receive clock pulses therefrom in the same manner as the gates $G_1$ and $G_2$. Each gate $G_4$ and $G_5$ has a third input $E_{g43}$ or $E_{g53}$ connected to the output of the additional (third) null amplifier $NV_3$, also in the same manner as the gates $G_1$ and $G_2$. The two gates $G_4$ and $G_5$, likewise designed as NOR gates, have their respective outputs $A_{g4}$ and $A_{g5}$ connected to the respective inputs of an auxiliary gate $G_6$ which as to functioning corresponds to the additional gate $G_3$ described above with reference to FIG. 1.

In distinction from the transmitting device shown in FIG. 1, the device according to FIG. 3 is equipped with an additional gate $G_8$ following the additional gate $G_3$, and also with a further auxiliary gate $G_7$ following the auxiliary gate $G_6$. The gate $G_8$ has one input $E_{g81}$ connected with the output $A_{g3}$ of gate $G_3$ and has its other input $E_{g82}$ connected with an output $A_{k32}$ of a further bistable flip-flop $K_3$ whose other output $A_{k31}$ is in connection with one input $E_{g71}$ of the auxiliary gate $G_7$. The other input $E_{g72}$ of gate $G_7$ is connected to the output $A_{g6}$ of gate $G_6$.

The flip-flop $K_3$ has its trigger input $E_{k32}$ connected with the output $A_{g9}$ of a NOT gate $G_9$ whose input $E_{g9}$ is in connection with the output $A_{tg}$ of the keyer TG. A set input (preparing input) $E_{k31}$ of flip-flop $K_3$ is connected to the output $A_{g10}$ of an entrance gate $G_{10}$ which has one input $E_{g101}$ connected to the output $A_{g1}$ of gate $G_1$ and has its other input $E_{g102}$ connected to the output $A_{g2}$ of gate $G_2$. Another set input (preparing input) $E_{k33}$ of flip-flop $K_3$ is connected through a further NOT gate $G_{11}$ with the output $A_{g10}$ of the entrance gate $G_{10}$.

The output $A_{g7}$ of gate $G_7$ is connected through an amplifier $V_5$ to a third luminescent diode $L_3$ whose light pulses are transmitted through a third optical transmission path $U_3$ to the receiving device to be described hereinafter with reference to FIG. 4.

The functioning of the transmitting device according to FIG. 3 will now be described with reference to the same operating conditions as those presumed in the foregoing discussion of FIGS. 1, 1a and 1b. Under these conditions there will obtain at the output of the entrance gate $G_{10}$ a voltage of the potential "0" in the interval between moments $t_1$ and $t_2$. Consequently, the potential at the input $E_{k31}$ of flip-flop $K_3$ is also at the "0" value. Due to the presence of the NOT gate $G_{11}$, a "1" potential is placed upon the input $E_{k33}$ of flip-flop $K_3$ during the same interval of time, and due to the NOT gate $G_9$ a "1" potential is likewise present at the input $E_{k32}$. This potential distribution at the inputs of the flip-flop $K_3$ has the result that the output $A_{k32}$ is at the "0" potential which consequently is also present at the input $E_{g82}$ of the additional gate $G_8$. The output $A_{g8}$ of gate $G_8$ then possesses a "1" potential (corresponding to diagram D7 in FIG. 1b). It will be seen that, as in the embodiment according to FIG. 1, light pulses are transmitted to the receiving portion of the system only in the time interval between $t_1$ and $t_2$ through the optical channel $U_2$.

The null amplifiers $NV_4$ and $NV_5$ in the embodiment of FIG. 3 serve for the transmission of only the higher amplitude values of the current J flowing through the high-voltage line H. For that reason, the secondary windings $wa_{22}$ in the second current transformer $Wa_2$ has only a fractional number of turns in comparison with those of the secondary winding $wa_{12}$ in the current transformer $Wa_1$. Since the desired range switching is to take place only at relatively high amplitudes of the current J being measured, the channel leading to the third optical transmission path $U_3$ must be blocked at the amplitude values of the current J upon which the foregoing discussion of the system performance is predicated. This requires that the output $A_{g7}$ of the auxiliary gate $G_7$ and consequently the input of the amplifier $V_5$ have a potential different from that obtaining at the output $A_{g8}$ of the additional gate $G_8$. Accordingly, a "0" potential is required at the output $A_{g7}$ in the interval between $t_1$ and $t_2$. Checking of the potentials existing during this interval at the inputs and outputs of the gates $G_4$ to $G_7$ will show that the necessary "0" potential at the output $A_{g7}$ does indeed exist.

When, however, the amplitude of the high-voltage current J departs from the operating condition presumed in the foregoing by being so large that the ramp output voltage of the integrator $I_1$, increasing from the moment $t_1$ in linear proportion to time, is smaller at the moment $t_3$ than the pilot voltage derived by the measuring network $M_1$ from the current J, then the pulse at $E_{k32}$ coincides at the triggering moment with such a polarity of the set (preparing) inputs $E_{k31}$ and $E_{k32}$ as to permit triggering of the bistable flip-flop $K_3$.

Consequently, the potential distribution at the outputs of the flip-flop $K_3$ will now change: at the one output $A_{k32}$ there now occurs a "1" potential and at the other output $A_{k31}$ a "0" potential. This also changes the potentials of the outputs of gate $G_8$ and gate $G_7$; the output $A_{g8}$ of gate $G_8$ now has "0" potential, and the output $A_{g7}$ of gate $G_7$ has "1" potential. Consequently, no light pulses are further transmitted through the optical channel $U_2$, but the transmission of pulses now takes place through the optical channel $U_3$, the switching from one to the other channel having occurred automatically.

As mentioned, the receiving device $E_2$ shown in FIG. 4 receives the light pulses in the three optical transmission channels $U_1$, $U_2$ and $U_3$ by means of respective photoelements $P_1$, $P_2$ and $P_3$. The receiving device $E_2$ is accommodated in a housing $G_{e2}$ and comprises a sign (polarity) memory VS corresponding to that of the receiving device shown in FIG. 2. The receiver of FIG. 4 is also equipped with an amplifying transistor network T and a transformer W comparable to the corresponding components in FIG. 2.

The receiving device $F_2$ of FIG. 4 differs from that of FIG. 2 essentially in being equipped with a second transistor amplifier network T' identical in design and performance with the network T, this being manifested in FIG. 4 by providing the components of network T' with the same reference characters as the respective components of network T except that a prime (') is added to the reference characters for network T'.

The amplifying transistor network T' is connected with further primary windings $w_{13}$ and $w_{14}$ of the transformer W. The primary windings $w_{13}$ and $w_{14}$ are supplied with direct-current pulses from a further current supply $S_{rz}$ of highly constant voltage, this operation being identical with the one described above with reference to the component $S_r$ in FIG. 2. The direct-current pulses passing through the primary windings $w_{13}$ and $w_{14}$ induce corresponding pulses in the secondary winding $w_2$ of the transformer W. A filter network F, preferably designed as a low pass, is connected to the secondary winding $w_2$.

To permit a distinction as to whether the pulses issuing from the secondary winding $w_2$ of transformer W are due to the operation of network T or network T', i.e. for ascertaining whether range switching has or has not occurred, the reference sources $S_r$ and $S_{rz}$ of constant voltage are designed differently from each other. If the respective amplitudes of the pulses issuing from the two reference sources $S_r$ and $S_{rz}$ are related to each other like the ratio of the numbers of winding turns of the secondary windings $wa_{12}$ and $wa_{22}$ in the non-insulated transformers $Wa_1$ and $Wa_2$ respectively, then the output $A_{f1}$ of the filter network always furnishes a measuring quantity proportional to the current J in the high-voltage line H.

Those skilled in the art will recognize from the foregoing description in conjunction with the accompanying drawings that it is an outstanding advantage of systems according to the invention to greatly simplify the coding means employed for translating the primarily measured high-voltage quantities into optically transmitted pulses. The simplified coding permits using relatively simple electronic coincidence-gate circuits on the high-voltage side of the system, this simplification being particularly manifest in the high-voltage portion and hence in the transmitting device of the system. A control of the integrator or corresponding ramp-voltage generator by a bistable flip-flop stage, in addition to the keyer (clock pulse generator) is no longer necessary, in contrast to the system heretofore proposed and briefly described in the introductory portion of this specification.

Another advantage of systems according to the invention resides in the fact that the provision of the additional null amplifier ($NV_3$) secures good linearity including the null region. A further advantage of systems according to the invention is the fact that the transmitting device does not necessitate the provision of counters or the like steppers as is the case with the coding systems otherwise employed.

To those skilled in the art it will be obvious upon a study of this disclosure that our invention permits of various further modifications and may be embodied in devices and circuitry other than illustrated and described herein, without departing from the essential features of the invention.

We claim:

1. A system for transferring an electric-current parameter from high voltage to low voltage, comprising a high-voltage member for carrying a current to be measured; current-responsive circuit means coupled with said member for providing a pilot voltage varying in dependence upon the current in said member; a first pulse generating network connected to said circuit means and having switching means responsive to the zero value of said pilot voltage to furnish a first output pulse indicative of the polarity of said pilot voltage; a second pulse generating network connected to said circuit means and having pulse-length modulating means responsive to said pilot voltage to furnish a second output pulse of a variable length proportional to the amplitude of said pilot voltage; two luminescent diodes connected to said first and second networks respectively to convert said pulses to optical radiation; low-voltage receiver means electrically insulated from said high-voltage member and said networks, said receiver means comprising two photoelements optically responsive to said radiation from said respective luminescent diodes, a transformer having two primary windings, respective amplifier networks connecting said photoelements to said respective primary windings, said transformer having a secondary winding, and a filter circuit connected to said secondary winding for issuing an output voltage proportional to said current.

2. A system for transferring an electric-current parameter from high voltage to low voltage, comprising an alternating-current high-voltage member for carrying a current to be measured, current-responsive circuit means coupled with said member for providing an alternating pilot voltage varying in accordance with the current in said member; a first pulse generating network connected to said circuit means and having switching means responsive to zero passage of said pilot voltage to furnish a first output pulse for each half-wave of said pilot voltage; a second pulse generating network connected to said circuit means and having pulse-length modulating means responsive to the amplitude of said pilot voltage to furnish a second output pulse of a variable length proportional to said current; two luminescent diodes connected to said first and second networks respectively to convert said pulses to optical radiation; low-voltage receiver means electrically insulated from said high-voltage member and said networks, said receiver means comprising two photoelements optically responsive to said radiation from said respective luminescent diodes, a transformer having two primary windings, respective amplifier circuits connecting said photoelements to said respective primary windings, said transformer having a secondary winding, and a filter circuit connected to said secondary winding for issuing an output voltage proportional to said current.

3. A system for transferring an electric-current parameter from high voltage to low voltage, comprising a high-voltage member for carrying a current to be measured; current-responsive circuit means coupled with said member to provide pilot voltages varying in dependence upon the current in said member; two pulse generating networks connected to said circuit means, each of said networks having pulse-length modulating means responsive to said respective pilot voltages to furnish an output pulse of variable length proportional to the amplitude of said pilot voltages; two luminescent diodes connected to said respective networks to convert said pulses to optical radiation; selective switching means ($K_3$, $G_7$, $G_8$) forming a mutual interlock connection between said two pulse generating networks and having a control circuit responsive to one of said pilot voltages for selectively switching either one of said networks to pulse issuing operation depending upon the current being within an upper and lower measuring range respectively; low-voltage receiver means electrically insulated from said high-voltage member and said networks, said receiver means comprising two photoelements optically responsive to said radiation from said respective luminescent diodes; and translating means connected to said photoelements for converting the received radiation pulses to an output voltage proportional to said current.

4. A system according to claim 1, comprising second current-responsive circuit means coupled with said member to provide a second pilot voltage varying in dependence upon said member; another pulse generating network connected to said second circuit means and having pulse-length modulating means responsive to said second pilot voltage to furnish an output pulse of variable length proportional to the amplitude of said second pilot voltage; another luminescent diode connected to said other pulse generating network to convert said latter pulses to optical radiation; selective switching means ($K_3$, $G_7$, $G_8$) forming a mutual interlock connection between said two pulse-length modulating means and being responsively connected to said pilot voltages for selectively switching either one of said pulse-length modulating networks to pulse issuing operation depending upon the current being within an upper and lower measuring range respectively; said receiver means comprising another photoelement responsive to radiation from said other luminescent diode, said transformer having two further primary windings, and respective amplifier networks connecting said latter two windings to said other photoelement and to the one photoelement that responds to the luminescent diode of said first pulse generating network.

5. A system according to claim 1, comprising an integrator having an output ramp voltage, said first and second pulse generating networks having each a null amplifier with two inputs connected to said pilot voltage and to said ramp voltages respectively, a clock pulse generator, first and second coincidence gates ($G_1$, $G_2$) of which each has an input connected to said clock pulse generator and another input connected to one of said respective null amplifiers, a bistable flip-flop ($K_1$) having two inputs, said two gates ($G_1$, $G_2$) having respective outputs connected to said two flip-flop inputs, a third gate ($G_3$) having two inputs connected to said respective outputs of said first and second gates, said two luminescent diodes being connected to the output of said flip-flop and to the output of said third gate respectively.

6. In a system according to claim 5, each of said first and second gates ($G_1$, $G_2$) having a third input, a third null amplifier ($NV_3$) having an output connected to said third inputs of said gates and having two amplifier inputs of which one is grounded to provide zero potential, said other input of said third null amplifier being connected to said integrator ramp voltage, whereby said third null amplifier changes its logic state when the ramp voltage passes from negative values through zero, whereby said third null amplifier releases said gates ($G_1$, $G_2$) at the moment of the zero passage.

7. A system according to claim 6, comprising two amplifiers connected serially ahead of said respective luminescent diodes.

8. In a system according to claim 1, said amplifier networks of said receiver means being formed of transistor circuits, a polarity sign memory interposed between one of said amplifier networks and the one photoelement ($P_1$) that responds to the luminescent diode ($L_1$) appertaining to said first pulse generating network, said memory comprising a bistable flip-flop stage having two outputs of which one provides voltage when the current being measured has one polarity and the other provides voltage when said current has the other polarity, said two flip-flop outputs being in controlling connection with said transistor circuits of said amplifier network.

9. In a system according to claim 8, said memory having an input connected to said one photoelement ($P_1$), said bistable flip-flop stage of said memory having two inputs, a first diode ($G1_1$) connecting one of said flip-flop inputs to said memory input, a transistor circuit (T) and a second diode ($G1_2$) connected in series between said other flip-flop input and said memory input, said second diode being poled in opposition to said first diode.

10. In a system according to claim 8, said two amplifier networks of transistor circuits having each a pair of inputs ($E_{t11}$, $E_{t12}$, $E_{t21}$, $E_{t22}$), said other photoelement ($P_2$) being connected to one input of each pair, each of said two transistor circuit networks comprising a first transistor ($T_{11}$ or $T_{21}$) having a base connected to the other input of one of said respective pairs and connecting said latter input with said one input of said same pair, said two flip-flop outputs being connected to said other inputs respectively of said pairs.

11. A system according to claim 10, comprising resistors ($R_4$, $R_9$) connected between said bases of said respective first transistors and said respective other inputs of said pairs, two further resistors with shunt capacitors, said first transistors having their respective collectors connected through said further resistors with said other inputs of said respective pairs and having grounded emitters respectively; each of said amplifier networks comprising a second transistor ($T_{12}$, $T_{22}$) having a base connected to the collector of one of said respective first transistors, a third transistor ($T_{31}$, $T_{32}$) connected to said second transistor to be controlled thereby; and a direct-voltage supply connected to said two primary windings of said transformer through said respective third transistors, whereby said amplifier networks cause direct current pulses to pass through one of said respective primary windings when the two inputs of said respective pairs have different potentials but prevent such pulses when said potentials are equal.

12. In a system according to claim 11, said direct-voltage supply being a voltage reference source of constant direct-voltage amplitude.

13. A system according to claim 5, comprising second current-responsive circuit means coupled with said member to provide a second pilot voltage varying in dependence upon said member, two further null amplifiers ($NV_4$, $NV_5$) of which each has two inputs connected to said second pilot voltage and to said ramp voltage respectively, two further coincidence gates ($G_4$, $G_5$) and a first auxiliary gate ($G_6$) to which said further null amplifiers are connected through said respective coincidence gates, a second auxiliary gate ($G_7$) having an input connected to the output of said first auxiliary gate, an additional gate ($G_8$) having an input connected to the output of said third gate ($G_3$); another bistable flip-flop ($K_3$) having two outputs, said second auxiliary gate ($G_7$) and said additional gate ($G_8$) having each another input connected to one of said respective flip-flop outputs, said other flip-flop ($K_3$) having input control means for releasing said second auxiliary gate ($G_7$) in dependence upon a given minimum magnitude of said current to be measured; a third luminescent diode ($L_3$) connected to the output of said second auxiliary gate ($G_7$); a third optical transmission channel including said third luminescent diode and having a third photoelement at its receiving end, said transformer having two further primary windings, and amplifier networks connecting said third photoelement with said two further primary windings.

14. A system according to claim 13, comprising a NOT gate ($G_9$) and an entrance gate ($G_{10}$), said other flip-flop having a trigger input connected through said NOT gate to said clock pulse generator and having two preparing inputs of which one is connected through said entrance gate to the outputs of said first and second gates ($G_1$, $G_2$), and another NOT gate ($G_{11}$) through which said other preparing input is connected with the output of said entrance gate ($G_{10}$).

15. In a system according to claim 14, all of said gates ($G_1$–$G_8$, $G_{10}$), with the exception of said two NOT gates, being NOR gates.

16. In a system according to claim 1, said current-responsive circuit means comprising an inductive sensing member and a resistance network connected to said sensing member to provide a voltage drop which constitutes said pilot voltage.

17. In a system according to claim 5, said current-responsive circuit means comprising an inductive sensing member and a bridge network of resistors, said bridge network having a bridge branch including a midpoint and having in said branch on each side of said point a voltage drop of a polarity opposed to that on the other side, said two voltage drops constituting said pilot voltage and being connected to said two null amplifiers respectively.

18. A system for transferring an electric-current parameter from high voltage to low voltage, comprising an alternating-current high-voltage member for carrying a current to be measured, current-responsive circuit means coupled with said member for providing a pilot voltage varying in accordance with the current in said member; a first pulse generating network connected to said circuit means and having switching means responsive to zero passage of said pilot voltage to furnish a first output pulse depending upon the polarity of said pilot voltage; a second pulse generating network connected to said circuit means and having pulse-length modulating means responsive to the amplitude of said pilot voltage to furnish a second output pulse of a variable length proportional to said current; and two optical transmission means having two luminescent diodes connected to said first and second networks respectively to convert said pulses to optical radiation.

19. A system for transferring an electric-current parameter from high voltage to low voltage, comprising a high-voltage member for carrying a current to be measured; current-responsive circuit means coupled with said member to provide pilot voltage varying in dependence upon the current in said member; two pulse generating networks connected to said circuit means, each of said networks having pulse-length modulating means responsive to said pilot voltage to furnish an output pulse of variable length proportional to the amplitude of the pilot voltage; two luminescent diodes connected to said respective networks to convert said pulses to optical radiation; selective switching means ($K_3$, $G_7$, $G_8$) forming a mutual interlock connection between said two pulse generating networks and having a control circuit responsive to the pilot voltage for selectively switching either one of said networks to pulse issuing operation depending upon the current being within an upper and lower measuring range respectively.

20. A system for transferring an electric-current parameter from high voltage to low voltage, comprising two photoelements responsive to polarity-denoting pulses and length-modulated pulses respectively to provide corresponding electrical pulses, a transformer having two primary windings, respective amplifier networks connecting said photoelements to said respective primary windings, said transformer having a secondary winding, and a filter circuit connected to said secondary winding for issuing an output voltage proportional to said current parameter, said amplifier networks being formed of transistor circuits, a polarity sign memory interposed between one of said amplifier networks and the one photoelement ($P_1$) that responds to the polarity-denoting pulses, said memory comprising a bistable flip-flop stage having two outputs of which one provides voltage in response to one denoted polarity and the other provides voltage in response to the other polarity, said two flip-flop outputs being in controlling connection with said transistor circuits of said amplifier networks.

References Cited

UNITED STATES PATENTS

| | | | |
|---|---|---|---|
| 3,363,174 | 1/1968 | Hudson et al. | 324—96 |
| 3,411,069 | 11/1968 | Kubler et al. | 324—96 |
| 3,419,802 | 12/1968 | Pelenc et al. | 324—96 |

RUDOLPH V. ROLINEC, Primary Examiner

U.S. Cl. X.R.

250—199, 340—190